Sept. 1, 1959 W. R. HATHORN, JR 2,902,026
PORTABLE BARBECUE PITS
Filed March 29, 1955 2 Sheets-Sheet 1
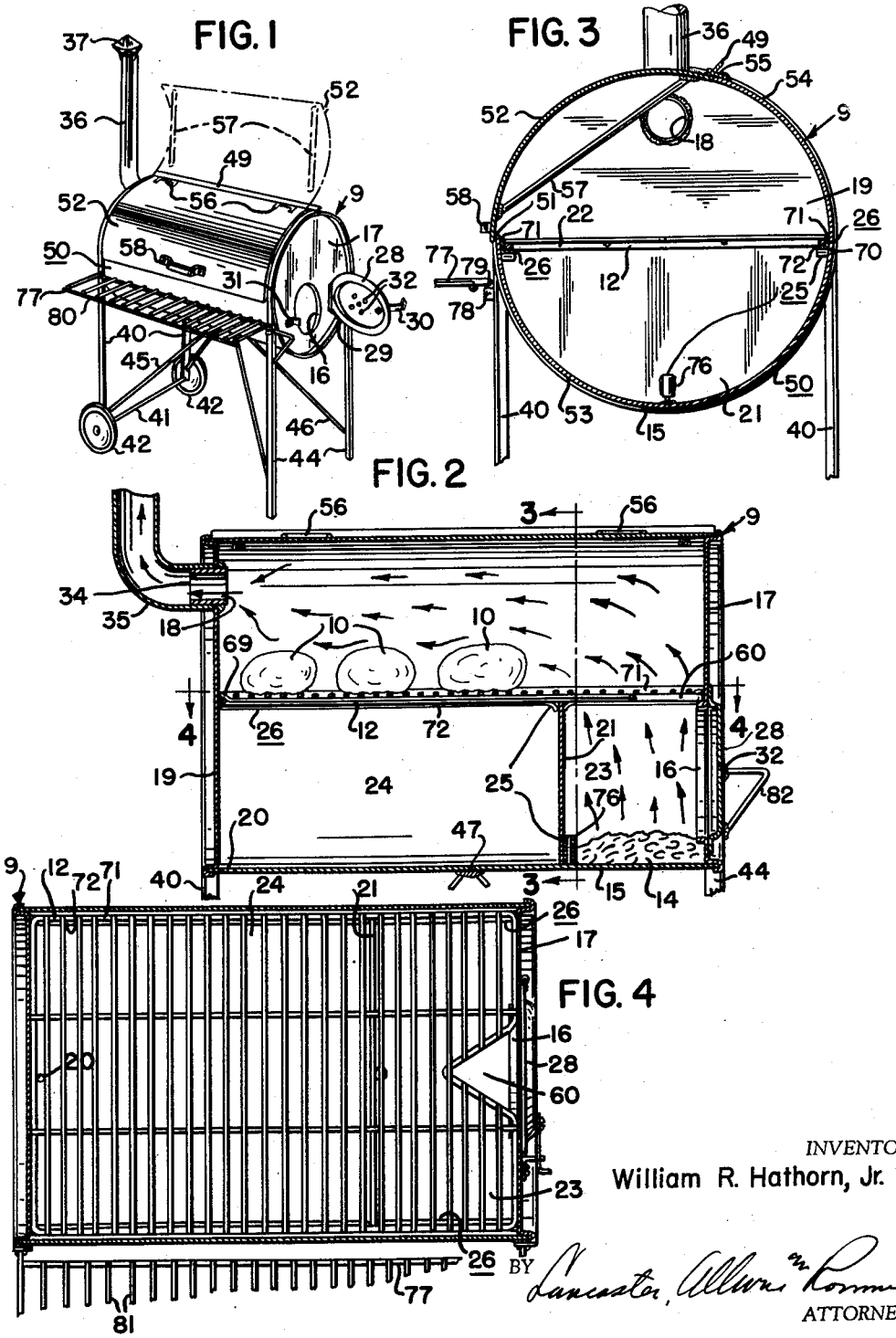
INVENTOR
William R. Hathorn, Jr.
BY Lancaster, Allwine & Rommel
ATTORNEYS

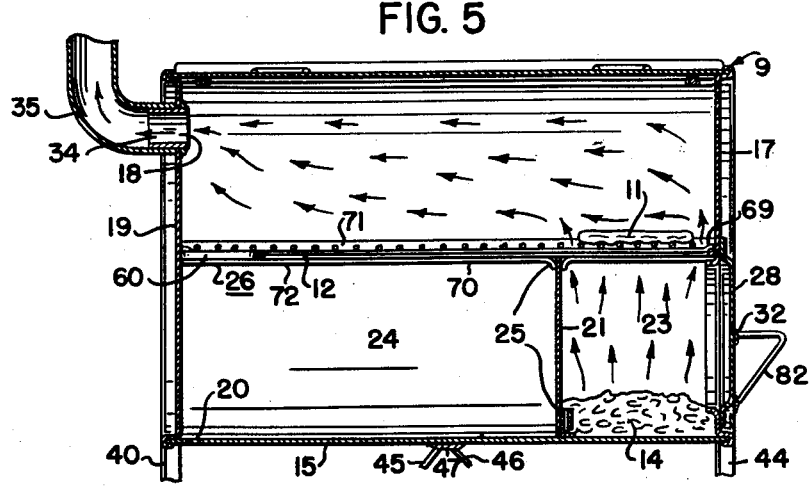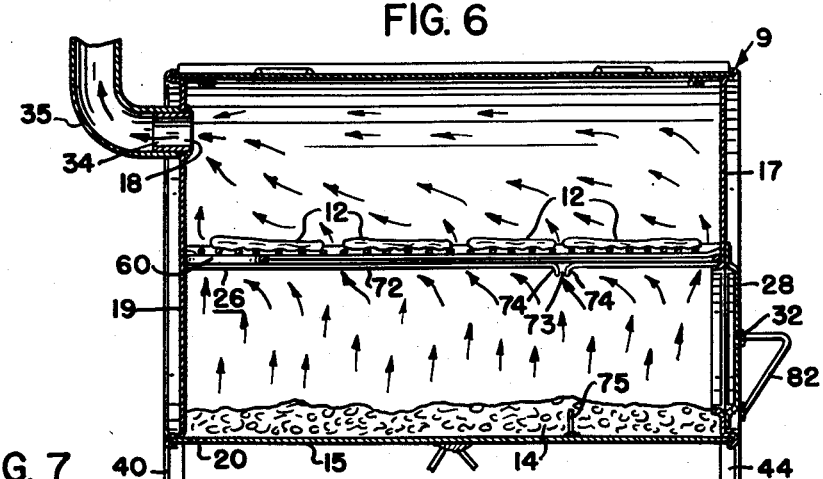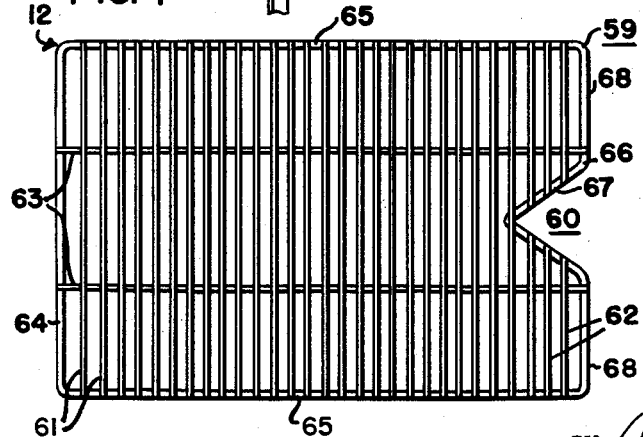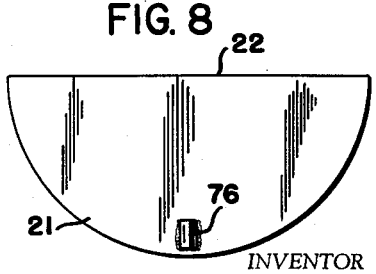
INVENTOR
William R. Hathorn, Jr.

United States Patent Office 2,902,026
Patented Sept. 1, 1959

2,902,026

PORTABLE BARBECUE PITS

William R. Hathorn, Jr., Alexandria, La.

Application March 29, 1955, Serial No. 497,601

2 Claims. (Cl. 126—25)

This invention relates to equipment of the general character variously designated as barbecue pits, ranges, ovens, etc., used for the roasting, broiling, smoke-curing, etc., of foods, such as flesh, fish and vegetables. In its preferred construction, the equipment is made as a portable unit so that it may readily be moved from place to place in the open, and moved to a shelter for storage when not in use.

This application is a continuation-in-part of my application Serial No. 417,143, filed March 18, 1954, now abandoned.

The principal objects of the invention are to provide equipment of this character, as units, each of which may be adjusted or arranged to barbecue, roast, smoke-cure or otherwise treat large quantities of food, such as large cuts of meat, many hams and the like, as when there are a great number of people to be fed, or to cook smaller quantities, such as a large steak or a few small steaks, with economy as to fuel, as when the requirements are for a small family; to construct and arrange the parts of the unit so that fat and juices dripping from the food while being heat treated may not drip into the fire, which is particularly advantageous as when barbecuing meat; and, to provide such equipment wherein the unit embodies a hood and access door, and is portable, so that the unit may be used out of doors and positioned in such manner that the hood will deflect prevailing winds from the door opening when placing, removing or inspecting food with respect to the grill of the unit or replenishing the supply of fuel.

Another object is to provide equipment for the purposes specified in which the unit may be adapted for use in treating by heat, a large quantity of food, such as the broiling of many steaks over the fire, using substantially the full capacity of the grill.

Another object is to so arrange the grill and fire compartment of the unit, and to provide the housing of the unit with a drip opening, so located and arranged that drippings may be removed by gravity from the unit, while food is being treated therein, and the drippings used for making gravy. This may be accomplished by providing the drip opening remote from the fire compartment and in the bottom of the unit housing, and mounting the housing on wheels, whereby the housing may be tilted to cause gravity flow of the drippings to and through the drip opening where it can be collected in a suitable receptacle.

Other objects and advantages will appear in the following detailed description of a highly successful embodiment of my invention, taken in connection with the accompanying drawings, forming a part of this specification and in which drawings:

Fig. 1 is a perspective view of one of the barbecue units looking toward a side and end thereof, showing an access door in closed position, in full lines, and in an open position by dot and dash lines, and a vent opening provided with a fire door, in open position.

Fig. 2 is an enlarged vertical section view longitudinally through a portion of the unit, and showing, by way of example, food, such as a number of hams being heat treated therein, burning fuel, and by arrows, the approximate path taken by the heat and smoke issuing from the fuel.

Figs. 3 and 4 are vertical, transverse and horizontal sectional views on the lines 3—3 and 4—4, respectively of unit shown in Fig. 2.

Figs. 5 and 6 are sectional views similar to Fig. 2, but showing, respectively, suitable arrangement of parts for broiling a single steak, and a large number of steaks.

Fig. 7 is a plan view of the grill.

Fig. 8 is a view in elevation of a baffle plate or screen wall provided to divide the lower portion of the housing into minor and major compartments as shown in Figs. 2 and 5.

In the drawings the equipment preferably comprises an elongated, horizontally disposed housing 9 adapted to contain food, such as hams 10, shown in Fig. 2, a steak 11 as shown in Fig. 5, or several steaks as shown in Fig. 6, resting on a grill 12 in the housing, and fuel 14 in a restricted zone above the bottom 15 of the housing, as shown in Figs. 2 and 5, or spread generally along the entire bottom of the housing in Fig. 6. The housing is provided with a vent opening 16 in an end wall 17 thereof, located adjacent the bottom 15, a second vent opening 18 in the other end wall 19, located adjacent the top thereof, and a drip opening 20 in the bottom 15 adjacent end wall 19; an upright baffle plate or screen wall 21 disposed crosswise in the housing in spaced relation to and adjacent the wall 17 having its upper margin 22 spaced below the upper portion of the housing, so that gases issuing from the fuel 14 will travel in the direction of the arrows shown in Figs. 2 and 5 to the vent opening 18 and then to the atmosphere as hereinafter described, the plate or wall dividing the lower portion of the housing into a minor compartment 23 and a major compartment 24; means 25 detachably retaining the plate or wall 21 in the position shown; and means 26 removably supporting the grill 12 in the housing closely adjacent to or in other words, next above the upper margin 22 of the plate or wall 21.

The vent opening 16 may be partially or entirely closed by a fire door 28, hinged as at 29 and provided with a catch lever 30 cooperating with a notched keeper 31 secured to the outer face of wall 17. If desired, the door may be provided with a plurality of perforations or openings 32 if it is desired to vent through the door when it is closed, as is customary in ovens and the like.

The vent opening 18 may be surrounded by an outwardly projecting thimble 34 which telescopically receives the one end of an elbow 35 of a smoke stack 36 which may be provided with a hood 37. The stack may be disposed vertical or adjusted to any desired angle to aid in providing the desired draft and to conduct gases to the atmosphere exteriorly of the housing 9 well above persons near the unit while in use.

It is also preferred to mount the housing 9 in a position well above the ground as by spaced apart forward standards 40, secured at opposite side of wall 19, carrying at their lower end portions, a transverse axle 41 upon the ends of which are mounted ground wheels 42, and by spaced apart rearward standards 44 secured at opposite sides of the wall 17 and extending downwardly therefrom for ground engagement. Suitable diagonal braces 45 and 46 may be provided to join the lower portions of the standards 40 and 44, respectively, with the underside of the bottom 15 as shown at 47.

The housing 9 is preferably in the form of a cylindrical shell, including the end walls 17 and 19, a major arcuate body portion 50 joined to the end walls in any suitable manner throughout the greater portion of their circumference, leaving an access opening 51 open to one side of the housing; and a minor arcuate lid or door 52 normally closing the opening 51. The major body portion 50 includes a bottom section 53, in which the minor and major compartments 23 and 24 are located and a hood section 54 rigid or integral with the bottom section and extending the length of the housing and over only portions of the compartments 23 and 24. The bottom and hood sections may be formed of a single sheet of metal, preferably provided at its upper portion with longitudinal angle section 55 one flange 49 of which extends upwardly and diagonally to act as a stop for the door 52, when in an open position, as shown in dot and dash lines in Fig. 1, the door, in the example shown, being attached to the flange 49 by hinges 56. The door 52 may be provided with braces 57 secured at ends to the inner side of the door adjacent its upper and lower margins. A suitable handle 58 is provided to facilitate opening and closing of the door.

The grill 12 is preferably made of bar or rod material, such as heavy wire, including a frame 59 shaped to provide an enlarged opening 60 at one end portion through which fuel may be passed when it is desired to add fuel to the burning fuel 14 in the lower portion of housing 9; a plurality of spaced major cross bars 61; a plurality of spaced minor cross bars 62; and a plurality of spaced longitudinally extending bars 63. The frame 59 may be shaped to provide a straight end run 64, parallel longitudinally extending runs 65 and another end run 66 which has an inwardly extending, centrally located V-formation 67 and short runs 68 extending from the ends of the V-formation and joined to the runs 65 at their ends opposite the end run 64. The cross bars 61, 62 and 63 may be welded to and upon the frame 59. The bars 63 are provided with offsets 69 at their ends so that the major portions of these bars are beneath the bars 61 and 62. The major bars 61 extend across the space between the runs 65 of the frame and the minor bars 62 extend across the space between these runs 65 and the V-formation 67, as shown in Fig. 7.

Referring now to the means 26 for removably supporting the grill 12 in the housing next above the margin 22 of the plate or wall 21 it preferably comprises a pair of angle irons 70 extending longitudinally of the interior of casing 9, disposed with their upright flanges 71 welded to the body portion 50 thereof and their horizontal flanges 72 extending inward and acting as ledges upon which the frame 59 of grill 12 rests.

These angle irons 70 may also conveniently form a part of the means 25 detachably retaining the plate or wall 21 in the position shown in Figs. 2 and 5. With this in view the horizontal flanges 72 are provided with transverse slots 73, shown to a good advantage in Fig. 6 and portions of the flanges bent downwardly as at 74 to assist in guiding the plate or wall into position for use, with the upper corners of the same accommodated in the slots 73. The means 25 may also include, by way of example, an upstanding lug 75 welded to the bottom 15 at a location to enter a sleeve 76 welded to a face of the plate or wall 21.

If desired, the equipment may include a service member or shelf 77 detachably secured to the front portion thereof, as by socket members 78 welded to the front standards 40 and 44 receiving downwardly extending lugs 79 on the frame 80 of the shelf. In the example shown the frame 80 has welded to its upper portion the ends of a plurality of spaced transverse bars 81.

To facilitate moving the equipment about and to lift one end of the equipment, to tilt the housing 9 for draining liquid from the compartment 24, suitable handles 82 are welded to the standards 44 extending outwardly from the plane of the wall 17.

The manner in which the equipment may be used will be clear from the foregoing description and by reference to the accompanying drawings. It is, however, pointed out the many uses to which the equipment may be put includes the cooking of large quantities of meat, such as shown at 10, in a manner that the heat and smoke from the burning fuel arises from the compartment 23, over which none of the food is placed. Then the heat and smoke flows toward the vent opening 18 and settles down on the meat and by doing so the food is cooked on the top side. In this way the juices flow over the food making it very juicy and not dry. Any juices dropping from the meat do not fall upon the fire but drop to the bottom of compartment 24 and by tilting the housing 9, in the manner described, the juices may be collected in a suitable receptacle, not shown in the drawing, as they flow or drip from the opening 20, and used in the making of gravy. If desired a chock, not shown in the drawing, may be placed under the standards 44 to slant the housing 9, for gravity flow of the juices from opening 20. Since the cooking time for such food varies from the six to eight hours, such as for smoking hams, and from ten to twelve hours when cooking large cuts of meat, fuel must be added to the fire, from time to time, and this may be accomplished by pouring it from above, through the enlarged opening 60 in the grill 12.

When broiling a single large steak 11 or a few small steaks, or heat treating a small quantity of food, the grill 12 may be turned end for end, so that the opening 60 is not over the compartment and the food placed directly over the compartment 23 in which the burning fuel is located, since very little if any of the juices drop into the fire when thus broiling. Or, if there are many steaks 12 or pieces of food to be broiled, or otherwise heat treated, the plate or wall 21 may be removed and the fire made throughout the entire length of the housing 9 before placing the grill and the food thereupon in the housing.

I claim:

1. In equipment for food barbecuing and the like including an elongated cylindrical housing providing a chamber therein, a grill horizontally disposed centrally of said chamber, said grill extending from side to side and from end to end of said chamber, grill supporting means positioned within said chamber, an upright baffle plate disposed crosswise within said chamber and extending below said grill supporting means in circumferential abutment with that portion of the interior surface of said cylindrical housing that is adjacent said baffle plate and below said grill, said baffle plate completely dividing the lowermost portion of said chamber into separate major and minor compartments, and being of such dimensions that its entire uppermost edge is in proximate abutment with the full width of the underside of said grill and its periphery below said grill is in circumferential abutment with the interior of said housing, said grill supporting means including a pair of flanges secured to said housing and extending within said chamber, said flanges being provided with diametrically opposed slots to permit the insertion therethrough of said baffle plate and being downturned at each side of said slots, forming a first baffle plate supporting means, and second baffle plate supporting means affixed to said housing and secured to said baffle plate adjacent the lowermost portion of said baffle plate for supporting the lowermost portion of said baffle plate in a fixed position with respect to said housing, so that fuel may be confined within said minor compartment only and small amounts of food may be efficiently barbecued by the utilization of only a small percentage of the total barbecue area provided within the housing.

2. Equipment for food barbecuing and the like as specified in claim 1 wherein said last mentioned baffle plate supporting means comprises a sleeve secured to said baffle plate that receives a lug secured to said housing.

(References on following page)

References Cited in the file of this patent

UNITED STATES PATENTS

| | | |
|---|---|---|
| 164,269 | Cook | June 8, 1875 |
| 293,973 | Mattice | Feb. 19, 1884 |
| 1,328,071 | Baldwin | Jan. 13, 1920 |
| 1,595,846 | Wood | Aug. 10, 1926 |
| 2,101,180 | Jacobs | Dec. 7, 1937 |
| 2,143,999 | Rosson | Jan. 17, 1939 |
| 2,302,984 | Tollzien | Nov. 24, 1942 |
| 2,314,627 | Millikan et al. | Mar. 23, 1943 |
| 2,349,617 | Gorman | May 23, 1944 |
| 2,520,578 | Treloar | Aug. 29, 1950 |
| 2,568,022 | Parker | Sept. 18, 1951 |
| 2,608,190 | Winning et al. | Aug. 26, 1952 |
| 2,625,928 | Gould | Jan. 20, 1953 |
| 2,666,425 | Hastings | Jan. 19, 1954 |
| 2,666,426 | Pollard | Jan. 19, 1954 |
| 2,740,395 | Goodwin | Apr. 3, 1956 |
| 2,851,941 | Gorgar | Sept. 16, 1958 |